United States Patent [19]

Korvenoja et al.

[11] Patent Number: 5,204,303
[45] Date of Patent: Apr. 20, 1993

[54] PREPARATION AND USE OF A NEW ZIEGLER-NATTA CATAYST COMPONENT

[75] Inventors: Inkeri T. Korvenoja, Hglsinki; Arja-Liisa Kostiainen, Porvoo; Fero I. Iiskola, Porvoo; Pekka J. E. Sormunen, Porvoo; Bill B. B. Gustatsson, Porvoo; Hilkka R. Knuuttila, Porvoo, all of Finland; Ulf Palmqvist, Stenungsund, Sweden

[73] Assignee: Neste Oy, Kulloo, Finland

[21] Appl. No.: 759,809

[22] Filed: Sep. 16, 1991

Related U.S. Application Data

[63] Continuation of Ser. No. 457,006, Dec. 22, 1989, abandoned.

[30] Foreign Application Priority Data

Dec. 30, 1988 [FI] Finland ................................ 886056

[51] Int. Cl.$^5$ .............................................. B01J 35/08
[52] U.S. Cl. .......................................... 502/9; 502/107; 502/108; 502/110; 502/111; 502/113; 502/125; 502/126; 502/127
[58] Field of Search ................... 502/9, 107, 108, 110, 502/111, 113, 125, 126, 127

[56] References Cited

U.S. PATENT DOCUMENTS

| | | | |
|---|---|---|---|
| 4,071,674 | 1/1978 | Kashiwa et al. | 502/125 |
| 4,076,924 | 2/1978 | Toyota et al. | 502/114 |
| 4,295,991 | 10/1981 | Wristers | 502/123 |
| 4,829,034 | 5/1989 | Iiskolan et al. | 302/9 |

Primary Examiner—Patrick P. Garvin
Assistant Examiner—Brent M. Peebles
Attorney, Agent, or Firm—Armstrong, Westerman, Hattori, McLeland & Naughton

[57] ABSTRACT

The invention relates to a method for the preparation of a supported procatalyst intended for the polymerization of olefines, in which particles are formed of magnesium dihalide and alcohol, the particles are reacted with an organic compound of a metal from the groups I–III, the thus obtained particulate product is activated by means of a titanium and/or vanadium compound and optionally a donor, and optionally a prepolymerization is carried out for the activated particles. A problem of such a method is how to form particles of magnesium dihalogenide and alcohol having a structure advantageous for the polymerization of olefins. The problem has in the present invention been solved so that the particles are formed by spray crystallizing (spray freezing) a mixture of magnesium dihalide and alcohol to complex particles of magnesium dihalide and alcohol. The hydroxyl content of the particles so obtained is much greater than earlier, which results in a much more active procatalyst than the preceding ones.

16 Claims, No Drawings

PREPARATION AND USE OF A NEW ZIEGLER-NATTA CATAYST COMPONENT

This application is a continuation of application Ser. No. 457,006 filed Dec. 22, 1989, now abandoned.

The invention relates to a method for the preparation of a supported procatalyst aimed for the polymerization of olefins, in which particles are formed of halides and alcohol, the particles are reacted with an organic compound of a metal of the groups I to III, the thus obtained product in particle form is activated by means of a titanium and/or vanadium compound and optionally an electron donor, and optionally a prepolymerization is carried out for the activated particles. The invention relates, furthermore, to the specific use of the procatalyst prepared by such a method for the polymerization of alpha-olefins. By procatalyst is meant in this context that part of the Ziegler-Natta catalyst which is based on the transition metal and which before the polymerization is combined with an organic compound of aluminum or another metal acting as a cocatalyst.

Methods of the kind mentioned, for, the preparation of a procatalyst are known in the literature. Through JP 59-215301 is known a method for the polymerization or copolymerization of ethylene, in which the procatalyst was prepared by bringing together a hot hydrocarbon emulsion of magnesium dichloride, ethanol and the emulgator and a cold liquid consisting of the same hydrocarbon. As a result spheroidal carrier was formed, the particles of which varied between 53-105 micrometers in diameter. The carrier was not preactivated with a organometallic compound, but the activation was carried out directly by suspending it at room temperature into titanium tetrachloride, after which electron donor was, moreover, added to the mixture. The procatalyst obtained by the emulgation solidification technique was especially well suited for the polymerization and copolymerization of ethylene.

Through the U.S. Pat. No.4,506,027 is known a lid carrier is produced first by spray drying the liquid, in which the magnesium chloride is dissolved in a mixture of ethanol and methanol. The ethanol and methanol hydroxyl containing carrier was then activated without any preactivation with titanium and vanadium halides. The result was a procatalyst, which combined with an organoaluminum compound acting as a cocatalyst worked well as a polymerization catalyst of alpha-olefins.

FI application print 862459 presents the preparation of a procatalyst by spray crystallization a mixture of magnesium dihalide and alcohol to a crystalline complex compound, the particles of which have in comparison with the previously mentioned method freer hydroxyl groups. The final procatalyst was obtained by activating the spray crystallized product with a tetravalent titanium compound.

The above-presented methods for the preparation of procatalysts belonging to the prior art represent the highest catalyst morphologic technique, but they do not represent the highest chemical modifying technique of procatalysts for according to the U.S. Pat. No. 4,071,674 it is advantageous to treat the carrier formed of magnesium dihalide and alcohol with an organic compound of a metal like aluminum before activating it with a transition metal compound like titanium. According to the teachings of this publication the capacity of activation and the activity of the final procatalyst particles increases due to this extra organometallic compound treatment. A drawback of this method is, however, that no attention has been paid to the morphology of the adduct of magnesium dichloride and alcohol. Thus, according to the examples of the publication the adduct is prepared by suspending the dry magnesium dihalide into hydrocarbon, after which the alcohol is added dropwise. As a result adduct product particles crystallizing spontaneously from the reaction solution were produced.

It can thus be said that of the two categories of prior art one is paying attention to the morphology of the magnesium dihalide—alcohol adduct and the other pays attention to the chemical preactivation of the adduct by means of an organometallic compound. Thus, the problem of the invention is how to combine these two ways of improvement, which are so important for the activity of the procatalyst.

Accordingly, the aim of the invention is to provide a procatalyst having a suitable morphology and which, simultaneously, has been preactivated with an organic compound of a metal like aluminum before it is activated with a transition metal compound. A further aim of the invention is to find the type of olefine polymerization for which the new, improved catalyst is best suitable. The procatalyst has been provided by a method for the preparation of a supported procatalyst aimed for the polymerization of olefines, in which (a) particles are formed from a magnesium dihalide and an alcohol,
(b) the particles are reacted with an organic compound of a metal of the groups I to III,
(c) the product in particle form obtained from the stage b) is activated by means of a titanium and/or vanadium compound and optionally an electron donor, and
(d) a prepolymerization is optionally carried out for the activated particles.

Characteristic of the method is that the particles of the stage a) are formed by spray crystallization of a mixture of magnesium dihalide and alcohol into crystalline complex particles of said magnesium dihalide and alcohol, which are then subjected to stages (b), (c) and (d) of the method. The method is based on the realizing that an adduct of magnesium dihalide and an alcohol must contain a large amount of hydroxyl groups in order that its preactivation according to stage (b) with the organic compound of a metal of the groups I to III would be successful. A sufficiently large hydroxyl amount great enough and a satisfactory morphology can only be provided by means of spray crystallization. It is true that the U.S. Pat. No. 4,071,674 presents preactivation of an adduct with an abundance of hydroxyl with an organometallic compound, but the morphology of the carrier particles formed has not been considered at all in the publication.

An advantageous use has, moreover, been found for the procatalyst prepared according to the method, i.e. for the preparation of ethylene having a narrow molecular weight distribution. From the narrow molecular weight distribution of polyethylene follows, furthermore, that the procatalyst according to the invention is particularly suitable for a multiple stage, preferably two stage polymerization giving polyethylene having a specific molecular weight distribution, in the various stages of which is used different contents of hydrogen controlling the molecular weight.

According to the present invention the magnesium dihalide carrier must first be activated to a suitable crystal form by complexing it with a crystal solvent. This takes place so that its particles are formed by spray crystallizing a mixture of magnesium dihalide and alcohol into crystalline complex particles of magnesium dihalide and alcohol. The spray crystallization is preferably carried out by heating alcohol solvated magnesium dihalide to a homogenic liquid and by spraying then the liquid by means of hot spraying gas into a cooled spray chamber, where the carrier complex particles of the magnesium halide and the alcohol are formed, the alcohol not being essentially volatilized. The spray crystallization is carried out by using gases which are inert in regard to the reaction components.

The magnesium dihalide shall be anhydrous and dry. The most preferable magnesium dihalide is magnesium dichloride. Alcohols have been found to be preferable crystal solvents, the most preferable dry (anhydric) absolute ethanol. Ethanol is forming with magnesium dichloride a crystalline complex $MgCl_2 \times aEtOH$, in which a is 0 to 6, preferably 2 to 6, and most preferably 3. Then the carrier complex is melted and sprayed into cold, inert gas being crystallized without vaporization of the crystal solvent. This spray crystallization of the carrier thus takes place by essentially similar activity as has been presented in our Finnish patent application FI-862459.

In spray crystallization the jet spraying of the melt complex takes place into cooled gas, so no transfer of substance or volatilization is taking place and the congealing melt is crystallized when sprayed to its original consistency. In the spray drying process according to the U.S. Pat. No. 4,506,027, on the other hand, considerable volatilization of alcohol is taking place and the product formed there is essentially less alcohol hydroxyl groups.

In the second stage the spray crystallized complex of magnesium dihalide and alcohol is reacted in the form of particles with an organic compound of a metal of the groups I to III of the periodical element system. The organometal compound is e.g. a compound according to the formula RM, in which R is an alkyl or an aryl group and M is lithium, sodium or potassium; a compound according to the formula $R_2M'$ in which R is the same as before and M' is zinc or cadmium; a compound according to the formula $R_{2-1}MgX_1$, in which R is the same as before, X is a halogen atom and 1 is 0 or 1; a compound according to the formula $MAlR_4$, in which R and M are the same as above the compounds according to the formula $R'_{3-m}AlX_m$, in which R' is a hydrogen atom, an alkyl group or an aryl group, X is the same as before and m is 0 or a positive number lower than 3; compounds according to the formula $R'_{3-n}Al(OR)_n$, in which R' and R are the same as before and n is a positive number greater than 0 but smaller than 3; or the compounds according to the formula $RAl(OR)X$, in which R and X are also the same as defined above. R and R' are preferably alkyl groups containing 1 to 12 carbon atoms, phenyl or benzyl groups and X is preferably chlorine or chromium. The most preferable are the organoaluminum compounds having the formula $R'_{3-m}AlX_m$.

The treatment with an organometallic compound simply takes place by bringing the catalyst complex particles prepared by spray crystallization into contact with an organometallic compound, such as aluminum alkyl. The treatment is preferably carried out at a temperature $-10°$ to $+30°$ C. and it preferably lasts about 30 to 180 minutes. The aluminum/ethanol proportion is preferably 0.5 to 2, most preferably 1. The treatment leads to the essentially quantitative removal of the crystal solvent i.e. the alcohol, and the result is an amorphic, preactivated carrier with a very large surface area.

The actual activation of the preactivated complex particles takes place by means of a titanium and/or vanadium compound and optionally an electron donor. The preactivated carrier is lead into contact with the transition metal compound mentioned, whereby catalytically active complexes between the magnesium dihalide, such as magnesium dichloride, and the transition metal compound, such as a titanium compound, are formed on the surface of the carrier. By selecting suitable titanium compounds, procatalysts active in the polymerization and copolymerization of ethylene are obtained, which produce polymer having a relatively narrow molecular weight distribution. Compounds of tetravalent titanium, such as titanium tetrahalide compounds, are preferable transition metal compounds. A particularly preferable compound is titanium tetrachloride. The vanadium compounds, such as $VCl_4$ and $VOCl_3$, are usually added among the titanium tetrachloride to modify the molecular weight distribution.

During the actual activation or after it, so-called electron donor compounds, such as an aliphatic or aromatic carboxylic acid or an alkyl ester or an acid halide thereof, a cyclic ether, an aliphatic or aromatic ketone, an aliphatic or aromatic aldehyde, an aliphatic or aromatic nitrile, an aliphatic or aromatic amine or an aromatic phosphine or a mixture of this kind of compounds, can be added to the procatalyst. Preferable internal electron donors are in particular the esters of aromatic carboxylic acids, e.g. di-isobutyl phthalate DIBP and cyclic esters, e.g. tetrahydrofurane THF. when using DIBP the advantage is achieved that the crystallinity of the polymer produced in the prepolymerization stage, e.g. that of the poly-4-methyl-1-pentene, increases.

The actual activation of the preactivated complex particles of the carrier substance simply takes place by bringing the particles into contact with the transition metal compound and the optional electron donor. The treatment is preferably carried out at about 30° to 110° C. and it preferably lasts for about 30 to 180 minutes. The result is, as to its morphology and chemical structure, a very usable procatalyst. The procatalyst can, alternatively, still be improved by prepolymerizating onto its surface one or several suitable alpha-olefines. Hereby, e.g. those advantages are achieved that the polymerization is started in a more controlled manner and the mechanical durability of the catalyst particles is improved, whereby the feeding properties of the catalyst into the polymerization processes are improved.

It is preferable to carry out the prepolymerization directly in the preparation stage of the catalyst, whereby extra transfer and treatment stages are avoided, which can diminish the efficiency of the catalyst. Preferable monomers are unsaturated hydrocarbons having 5 to 12 carbon atoms and requiring a stereospecific catalyst or mixtures thereof. These are liquids at room temperature and in normal pressure. Preferable monomers are 4-methyl-1-pentene and styrene.

As the cocatalyst of the prepolymerization stage can be chosen any suitable organometallic catalyst of the Ziegler-Natta catalyst system. Preferable compounds are of the form $R_mAlX_{3-m}$, in which R is an alkyl, cycloalkyl or aryl group having 1 to 10 carbon atoms, X is a halogen atom, e.g. Cl or Br, and m is 0, 1, 2, or 3. As suitable aluminum compounds can be mentioned the trialkylaluminums, such as trimethylaluminum, triethylaluminum, tri-isopropylaluminum, tri-isobuthylaluminum, trioctylaluminum, etc., dialkylaluminumhalides, such as diethylaluminum chloride, di-isopropylaluminum chloride, di-isobutyl-aluminum chloride, dioctylaluminum chloride, etc., alkylaluminumsesquihalides, etc. Of these, particularly the trialkylaluminums, such as triethyl and tri-isobuthylaluminum, are preferable.

It is preferable in the prepolymerization of a catalyst if the polymer surrounding the catalyst particles is stereospecific. The electrospecifity is achieved except by the addition of the above-described, so-called internal electron donor at the actual activation stage, also by adding to the organometallic compound used as the prepolymerization cocatalyst a so-called external donor. It can thus be seen that it is worth while aiming at stereospecifity even in the case that non-steric ethylene monomer is being polymerized.

An external electron donor, which is a straight-chain or branched compound containing heteroatoms, should be used in the prepolymerization. Preferable are compounds according to the formula (1):

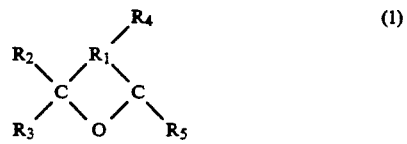

in which $R_1$ and $R_4$ are hydrocarbon groups having preferably 2-5 carbon atoms, $R_2$, $R_3$, and $R_4$ are each hydrocarbons or alkyl groups having preferably 2-5 carbon atoms. Preferable in particular are cineoles, such as 1.4, 1.8, and m-cineole. An outside donor can also consist of a silicon compound, preferably aryl alkyl silane, particularly diphenyldimethoxy silane. The prepolymerization is carried out in the same manner as any prepolymerization of Ziegler-Natta catalyst particles known in the field. Hereby, a preferable aluminum/titanium proportion is 1–50, still more preferably 1–10, and the aluminum/donor proportion is preferably about 1–10, still more preferably about 1–5. The monomer/titanium proportion is about 10–200, preferably about 10–40. The polymerization is carried out in normal pressure, the temperature is 10°–30° C. and it lasts about 15–120 minutes, preferably about 15–30 minutes.

The invention is illustrated by the following examples:

PREPARATION OF THE CARRIER

A spray crystallized, spheroidal carrier complex MgCl$_2$.3EtOH was prepared as follows:

Into a nitrified autoclave of 110 l was charged 35 kg of dry MgCl$_2$ and 65 l of dry ethanol. This reaction mixture was melted at +110° C. under agitation at the end. After an agitation of 2 hours the clear homogenized mixture was fed by spraying at a velocity of 10 kg/h in a cooled spray chamber, to which was led as cooling medium nitrogen being at the temperature −20° C. As a nozzle a gas-liquid-fluidisizing nozzle with the diameter of 9 mm was used. As spraying gas was used dried nitrogen at a temperature of +130° C. with a feeding velocity of 40 kg/h. The product was fluidic and in the form of spheroidal particles.

EXAMPLE 1

A. Preactivation of the carrier 5g of the above-mentioned carrier complex MgCl$_2$.EtOH containing 65 millimols of EtOH was weighed to a reactor of 250 ml furnished with an agitator, a reflux condenser, a thermometer and a nitrogen stopper. To the reactor, was added 30 ml pentane dried on molecule sieves. The mixture was cooled to −10° C. and into the reactor was dropped from a drop funnel 114 ml (70 millimols TEA) 10 % by weight triethylaluminum having pentane as solvent. The temperature was raised to the boiling point 36° C. of pentane and was kept there for an hour.

The preactivated carrier obtained was washed five times with 3 ml amounts of pentane at room temperature and was left to the last washing solution.

B. Activation with titanium tetrachloride

The carrier precipitate obtained above was cooled to −10° C. and to the reactor was added 0.8 ml (7 mmol) TiCl$_4$. The temperature was raised to the boiling point of pentane and was kept there for an hour. The catalyst precipitate was washed at room temperature three times with 30 ml pentane and was left in the last washing solution.

The consistency of the separated catalyst component sample dried with nitrogen gas was: Ti 7.2%, Mg 15.0%, Al 2.4% and Cl 64.8%.

C. Prepolymerization

The catalyst component obtained above was prepolymerized as follows:

To the above-mentioned mixture was added 10% by weight triisobuthylaluminum in pentane 113 ml (40 mmol TIBA) and cineole 1.22 ml (7 mmol), so the molar ratio Al/cineole was 5.5. The reaction mixture was agitated at room temperature for 10 minutes. To the mixture was added slowly 4-methyl-1-pentene 18.5 ml (0.15 mol). The agitation was continued for one hour, after which the precipitate was washed three times with pentane and dried with nitrogen. 8.0g of prepolymerized catalyst was obtained and it contained Mg 5.1% by weight, Ti 1.6% by weight, and Al 1.7% by weight.

EXAMPLE 2

A. The carrier was preactivated as in Example 1

B. Activation with titanium tetrachloride

The preactivated carrier was washed still four times with 100 ml heptane at room temperature and was left in the last washing liquid. 40 ml of TiCl was added into it and the temperature was raised to 110° C. for two hours. The precipitate obtained was washed four times with 100 ml heptane at 80° C. and once with 100 ml pentane and dried with nitrogen. The yield of the titanated component was 2.8g and its consistency was: Mg 10.3% by weight, Ti 14.8% by weight, Al 1.4% by weigh and Cl 69.6% by weight.

C. Prepolymerization

The catalyst component obtained above (1 g) was prepolymerized in the manner described in Example 1, the molar proportions of the components being the following: 4-methyl-1-pentene/Ti=30 and Al/cineole=5. The yield of the prepolymerized catalyst was 1.78g.

EXAMPLE 3

A. The carrier was preactivated as in example 1

B. Activation with titanium tetrachloride

After the preactivation stage 200 ml of dry heptane, 10 ml (0.09 mole) of TiCl₄ and 2.8 ml (0.01 mole)-diisobutylphlhalate (DIBP) was added onto the carrier at room temperature. After this the temperature was raised to 90° C. for one hour, after which the precipitate obtained was washed four times with 200 ml of heptane and once with 200 ml of pentane and dried by nitrogen blowing. The yield of the solid catalyst component was 9.3g and it contained: Mg 4.9%, Ti 10.6%, Al 0.9%, Cl 48.4% and DIBP 31.2%.

C. Prepolymerization 2 g of the catalyst component obtained was prepolymerized in the manner described in Example 1 and the yield of the prepolymerized catalyst was 1.75g.

EXAMPLE 4

A. The carrier was preactivated as in Example 1

B. Activation with titanium tetrachloride

Onto the activated carrier precipitate was added 200 ml of heptane and 25 ml of tetrahydrofurane to which 1 g of TiCl₄.2THF complex has been dissolved. The product obtained was agitated in four hours at room temperature and dried with nitrogen flow. The yield of the catalyst component was 7.1 g and it contained: Mg 8.9%, Ti 1.4%, Cl 40.5% and THD 9.3%.

Polymerization method

1. Test polymerization of ethylene

To a three liter reactor was added two liters of pentane, which had been purified with active aluminum oxide and mole cule sieves. 20–100 mg of the catalyst, dissolved in a little amount of pentane, is fed from a feed ampoule and the temperature is raised to 80° C. 5 ml of triethylaluminum in a 10% by weight solution is used as a cocatalyst.

5 bar of hydrogen is pressurized to a vessel of 0.5l from which it is lead together with the aluminum alkyl and ethylene into the reactor. The total pressure is raised with ethylene to 15 bars, the temperature to 90° C. and the polymerization is continued in 60 to 90 minutes. During the polymerization ethylene gas is added in order to keep the pressure constant.

2. Copolymerization

The copolymerization of ethylene with alpha-olefines is carried out as polymerization above, except that co-monomer (4-methyl-1-pentene, 300 ml) is added into the medium (1800 ml of pentane) immediately after the addition of the catalyst.

3. Two-stage polymerization

Two-stage polymerization is carried out as follows: the first stage is like a usual test polymerization, except that into the reactor is now pressurized much hydrogen (10 bars/0.5l vessel) and ethylene so that the total pressure is 11 bars. After an one and half hour driving time the pressure is lowered to 2 bars and the reactor is repressurized by adding comonomer 120 ml (4-methyl-1-pentene) and ethylene so that the total pressure is 16.5 bars; hydrogen is not added. The polymerization is continued in half an hour at a temperature of 70° C.

The melt viscosities of the polymers were measured with 21.6 and 2.16 kg weights MI(21.6) and MI(2.16) according to the standard ASTM D 1238, condition 190/21.6) and condition 190/2.16. The melt flow proportion is the proportion of the melt viscosities MI(21.6) and MI(2.16).

The polymerization results when using the catalysts prepared in the various examples are presented in Table 1.

TABLE 1

| Example | KAT mg | G PE | AKT gPE/g | MI (21.6) kat h | MI (2.16) | Melt flow proportion | D g/ml |
|---|---|---|---|---|---|---|---|
| 1b | 25 | 743 | 29720 | 32.10 | 0.91 | 35.2 | |
| 1c | 85 | 382 | 2996 | 20.35 | 0.69 | 29.5 | |
| 1a c | 52 | 460 | 8845 | 142.2 | 4.5 | 31.2 | 0.946 |
| 1a d | 93 | 480 | 3440 | 2.03 | 0.02 | 83.00 | |
| 2b | 27 | 294 | 7270 | 5.3 | 0.16 | 34.1 | |
| 2a | 52 | 436 | 5589 | | | | |
| 3b | 29 | 545 | 12520 | 14.3 | 0.46 | 31.1 | |
| 3a | 54 | 696 | 8636 | 7.1 | 0.20 | 35.6 | |
| 4b | 50 | 68 | 902 | 14.8 | 0.55 | 26.8 | |
| 4a | 145 | 599 | 2753 | 15.2 | 0.63 | 24.0 | | b = before prepolymerization
a = after prepolymerization
c = copolymerization with 4-methyl-1-pentene
d = two stage polymerization Gas phase polymerization Catalyst prepared according to Example 1 was used for the polymerization of ethylene in gas phase with pilot equipment. Catalyst was fed with the velocity 3g/h to the gas phase reactor and the reaction was started by adding 10% by weight of trie-thylenealuminum solution as cocatalyst. To the gas space was continuously lead nitrogen 36% by volume, hydrogen 26% by volume and ethylene 38% by volume. The productivity of the catalyst was 5 kg PE/g catalyst.

For the polyethylene obtained the following properties were measured: density 0.963g/ml, MI(2.16) =7.5, ash content 300ppm, bulk density 470g/1, average particle size 1.6 mm, tensile strength (according to ASTM D638) 26.1mpA, HDT value (ASTM D 648) 74° C. j Izod impact strength ASTM d256, 20° C.) 42.

We claim:

1. A method for the preparation of a supported procatalyst useful in the polymerization of olefins comprising:
   (a) forming particles of magnesium dihalide and alcohol,
   (b) reacting the particles with an organometal compound selected from the group consisting of compounds of the formula RM, wherein R is alkyl or aryl and M is lithium, sodium or potassium; R₂M', wherein R is alkyl or aryl and M' is zinc or cadmium; R₂₋ₗMgXₗ, wherein R is alkyl or aryl, X is a halogen atom and 1 is 0 or 1; MAlR₄, wherein M is lithium, sodium or potassium and R is alkyl or aryl; R'₃₋ₘAlXₘ, wherein R' is hydrogen, alkyl or aryl, X is a halogen atom and M is 0 or a positive number lower than 3; R'₃₋ₙAl(OR)ₙ, wherein R' is hydrogen, alkyl or aryl, R is alkyl or aryl and n is a positive number greater than 0 but smaller than 3; and RAl(OR)X, wherein R is alkyl or aryl and X is a halogen atom,
   (c) reacting the particle product of stage (b) with a titanium and/or vanadium compound and optionally and electron donor, and (d) optionally prepolymerizing the particle product of step (c), wherein said particles of magnesium dihalide and alcohol are formed by spray crystallizing a mixture of magnesium dihalide and alcohol to form crystallized complex particles.

2. The method of claim 1, wherein said spray crystallizing is carried out by heating the alcohol solvated magnesium dihalide to a homogeneous liquid and spraying the liquid by means of hot spray gas into a cooled spray chamber, where the complex particles of magnesium dihalide and alcohol are formed without an essential evaporation of the alcohol.

3. The method of claim 1 or 2, wherein the magnesium dihalide is magnesium dichloride.

4. The method of claim 1 or 2, wherein the alcohol is an aliphatic alcohol.

5. The method of claim 1 or 2 wherein the organometal compound is trialkylaluminum.

6. The method of claim 1 or 2 wherein the titanium compound is $TiCl_4$.

7. The method of claim 1 or 2 wherein the vanadium is $VCl_4$ or $VOCl_3$.

8. The method of claim 1 or 2 wherein the particles of stage (b) are reacted with the titanium and/or vanadium compound in the presence of an electron donor, said electron donor being an ester of an aromatic carboxylic acid or a cyclic ester.

9. The method of claim 1 or 2 wherein a prepolymerization is carried out with an alpha-olefin in the presence of trialkylaluminum.

10. The method of claim 9, wherein 4-methyl-pentene is used as the alpha-olefin.

11. The method of claim 9, wherein the prepolymerization is carried in the presence of an electron donor.

12. The method of claim 3, wherein said magnesium dichloride is dry and anhydrous.

13. The method of claim 4, wherein said aliphatic alcohol is dry ethanol or a dry mixture thereof.

14. The method of claim 8, wherein the particle product of stage (b) is reacted with the titanium and/or vanadium compound in the presence of an aromatic carboxylic acid, said aromatic carboxylic acid being di-isobutylphlhalate.

15. The method of claim 8, wherein the particle product of stage (b) is reacted with the titanium and/or vanadium compound in the presence of a cyclic ester, said cyclic ester being tetrahydrofurane.

16. The method of claim 11, wherein said electron donor is cineole.

* * * * *

UNITED STATES PATENT AND TRADEMARK OFFICE
CERTIFICATE OF CORRECTION

PATENT NO. : 5,204,303
DATED : April 20, 1993
INVENTOR(S) : Tarju I. KORVENOJA et al It is certified that error appears in the above-indentified patent and that said Letters Patent is hereby corrected as shown below:

On the cover page, Item [54], line 2, and Col. line 2, "CATAYST" should be --CATALYST--.

On the cover page, Item [75] the first, third and fifth named inventors are incorrect.

First Name: "Inkeri T. Korvenoja" should be --Tarja I. Korvenoja--;
Second Name: "Fero I. Iiskola" should be --Eero I. Iiskola--; and
Fifth Name: "Bill B.B. Gustatsson" should be --Bill B.B. Gustafsson--.

Signed and Sealed this

Twenty-fourth Day of May, 1994

Attest:

BRUCE LEHMAN

Attesting Officer

Commissioner of Patents and Trademarks